(12) United States Patent
Agarwal et al.

(10) Patent No.: US 10,212,693 B2
(45) Date of Patent: Feb. 19, 2019

(54) TRACKING AREA PLANNING

(71) Applicant: Parallel Wireless, Inc., Nashua, NH (US)

(72) Inventors: Kaitki Agarwal, Westford, MA (US); Kartik Shashikant Raval, Pune (IN)

(73) Assignee: Parallel Wireless, Inc, Nashua, NH (US)

( * ) Notice: Subject to any disclaimer, the term of this patent is extended or adjusted under 35 U.S.C. 154(b) by 75 days.

(21) Appl. No.: 14/930,535

(22) Filed: Nov. 2, 2015

(65) Prior Publication Data

US 2016/0128020 A1    May 5, 2016

Related U.S. Application Data

(60) Provisional application No. 62/074,533, filed on Nov. 3, 2014.

(51) Int. Cl.
| | |
|---|---|
| *H04W 68/12* | (2009.01) |
| *H04W 8/02* | (2009.01) |
| *H04W 64/00* | (2009.01) |
| *H04W 68/04* | (2009.01) |
| *H04W 88/16* | (2009.01) |
| *H04W 92/14* | (2009.01) |
| *H04W 36/24* | (2009.01) |

(52) U.S. Cl.
CPC .............. *H04W 68/12* (2013.01); *H04W 8/02* (2013.01); *H04W 64/00* (2013.01); *H04W 68/04* (2013.01); *H04W 36/245* (2013.01); *H04W 88/16* (2013.01); *H04W 92/14* (2013.01)

(58) Field of Classification Search
CPC ....... H04W 68/12; H04W 8/02; H04W 64/00; H04W 68/04; H04W 36/245; H04W 88/16; H04W 92/14
See application file for complete search history.

(56) References Cited

U.S. PATENT DOCUMENTS

| | | |
|---|---|---|
| 2007/0173259 A1 | 7/2007 | Akihara |
| 2009/0291695 A1 | 11/2009 | Lipford et al. |
| 2010/0279616 A1 | 11/2010 | Jin et al. |

(Continued)

OTHER PUBLICATIONS

3rd Generation Partnership Project, 3GPP TS 32.752 V9.3.0 (Oct. 2010), "3rd Generation Partnership Project; Technical Specification Group Services and System Aspects; Telecommunication Management; Evolved Packet Core (EPC) Network Resource Model (NRM) Integration Reference Point (IRP); Information Service (IS) (Release 9)," Oct. 2010, V9.3.0.

(Continued)

*Primary Examiner* — Eric Myers

(74) *Attorney, Agent, or Firm* — Michael Y. Saji

(57) ABSTRACT

A method is disclosed for improved tracking area planning and handling, comprising: assigning a single tracking area code to a plurality of eNodeBs at a messaging concentrator gateway, the messaging concentrator gateway situated in a network between the plurality of eNodeBs and the core network; storing, at the messaging concentrator gateway, at least one indicator of a last known location of a user equipment (UE) other than the single tracking area code; receiving a paging message from the core network at the messaging concentrator gateway for a UE; and performing a paging sequence using the at least one indicator to identify a set of eNodeBs to page the UE, thereby allowing larger tracking area list sizes to be used without increasing signaling traffic between the radio access network and the core network.

14 Claims, 6 Drawing Sheets

(56) References Cited

U.S. PATENT DOCUMENTS

| | | | |
|---|---|---|---|
| 2012/0115515 | A1 | 5/2012 | Lopez et al. |
| 2012/0295643 | A1 | 11/2012 | Arvidsson et al. |
| 2013/0017792 | A1 | 1/2013 | Miller |
| 2013/0143563 | A1 | 6/2013 | Singh et al. |
| 2013/0303145 | A1 | 11/2013 | Harrang et al. |
| 2013/0316706 | A1 | 11/2013 | Knauft |
| 2014/0106790 | A1 | 4/2014 | Kakinada et al. |
| 2014/0133456 | A1 | 5/2014 | Donepudi et al. |
| 2014/0295879 | A1 | 10/2014 | Yang |
| 2015/0289229 | A1 | 10/2015 | Ahluwalia et al. |

OTHER PUBLICATIONS

LTE: Tracking Area (TA) and Tracking Area Update (TAU), Netmanias (Aug. 30, 2013), http://www.netmanias.com/en/?m=view&id=blog&no=5930&vm=pdf.

European Telecommunications Standards Institute, ETSI TS 123 401 v11.3.0 (Nov. 2012), "LTE; General Packet Radio Service (GPRS) Enhancements for Evolved Universal Terrestrial Radio Access Network (E-UTRAN) Access (3GPP TS 23.401 version 11.3.0 Release 11)," Nov. 2012, V11.3.0.

3rd Generation Partnership Project, 3GPP TS 25.304 V10.0.0 (Mar. 2011), "3rd Generation Partnership Project; Technical Specification Group Radio Access Network; User Equipment (UE) Procedures in Idle Mode and Procedures for Cell Reselection in Connected Mode (Release 10)," Mar. 2011, V10.0.0.

European Telecommunications Standards Institute, ETSI TS 125 331 v12.3.0 (Oct. 2014), "Universal Mobile Telecommunications System (UMTS); Radio Resource Control (RRC); Protocol Specification (3GPP TS 25.331 version 12.3.0 Release 12)," Oct. 2014, V12.3.0.

Lan Wang, Yongsheng Zhang, and Zhenrong Wei, "Mobility Management Schemes at Radio Network Layer for LTE Femtocells," Apr. 26, 2009, XP-002565259, entire document.

Written Opinion of the International Searching Authority for PCT/US2015/0558689, received Feb. 2, 2016.

TRACKING AREA PLANNING

CROSS-REFERENCE TO RELATED APPLICATIONS

This application claims the benefit of priority under 35 U.S.C. § 119(e) to U.S. Provisional Patent Application No. 62/074,533, entitled "Improved Tracking Area Planning," filed on Nov. 3, 2014, the entire contents of which are hereby incorporated by reference for all purposes. In addition, this application incorporates the following applications by reference in their entirety: U.S. patent application Ser. No. 14/034,915, entitled "Dynamic Multi-Access Wireless Network Virtualization," filed on Sep. 23, 2013; U.S. patent application Ser. No. 14/024,717, entitled "Heterogeneous Self-Organizing Network for Access and Backhaul," and filed on Sep. 12, 2013; U.S. patent application Ser. No. 14/146,857, entitled "Heterogeneous Self-Organizing Network for Access and Backhaul," and filed on Jan. 3, 2014; U.S. patent application Ser. No. 14/571,250, entitled "Virtualization of the Evolved Packet Core to Create a Local EPC," filed on Dec. 15, 2014; U.S. patent application Ser. No. 14/806,594, entitled "Signaling Storm Reduction from Radio Networks," filed on Jul. 22, 2015; and U.S. patent application Ser. No. 14/822,839, entitled "Congestion and Overload Reduction," filed on Aug. 10, 2015.

BACKGROUND

In the current state of the art, a mobile wireless operator network requires a great deal of planning One aspect of planning that is required is radio frequency (RF) planning, that is, the planning of emplacements of transmitting towers. RF planning includes deciding how many towers to place, what direction to direct antennas, considering the impact of topography, foliage, etc. on radio propagation, selecting one or more frequencies for use when multiple options for frequency are available, and other planning factors. Notably, planning for capacity includes accounting not only for the number of projected users at one time but also the projected usage of those users, both for signaling and user data.

As well, a user equipment (UE) enters into an idle mode when its radio connection is released. Once in idle mode, if the UE needs to be reached by the network, LTE standards define a procedure called paging. Paging involves broadcasting the UE's identity in the radio cells belonging to a set of eNodeBs grouped into tracking areas. The UE could be present in one of the cells and will respond to paging by performing a service request procedure. This results in the radio connection being re-established and the network becoming able to communicate with the UE for either control or data traffic. Since many UEs in the LTE network are in idle mode at any given time, this equates to a high number of paging attempts going on a given network. A paging strategy is needed to reach the UE while reducing load and effectively utilizing paging resources.

SUMMARY

Systems and methods are disclosed for improved tracking area planning and handling. In one embodiment, a method is disclosed, comprising: assigning a single tracking area code to a plurality of eNodeBs at a messaging concentrator gateway, the messaging concentrator gateway situated in a network between the plurality of eNodeBs and the core network; storing, at the messaging concentrator gateway, at least one indicator of a last known location of a user equipment (UE) other than the single tracking area code; receiving a paging message from the core network at the messaging concentrator gateway for a UE; and performing a paging sequence using the at least one indicator to identify a set of eNodeBs to page the UE, thereby allowing larger tracking area list sizes to be used without increasing signaling traffic between the radio access network and the core network.

The method may further comprise subsequently updating the single tracking area code at the plurality of eNodeBs. The method may further comprise segmenting the plurality of eNodeBs into subgroups, and performing paging on each of the subgroups in a specified order. The method may further comprise assigning a single tracking area code to all eNodeBs coupled to the messaging concentrator gateway. The method may further comprise assigning a second tracking area code to a second plurality of eNodeBs at the messaging concentrator gateway. The method may further comprise paging the UE at both a last known eNodeB of the UE and at the last known eNodeB's neighbor eNodeBs.

In another embodiment, a system is disclosed, comprising: a plurality of eNodeBs; a core mobility node situated in a core network providing mobility services to the plurality of eNodeBs; and a signaling concentrator node situated between the plurality of eNodeBs and the core mobility node, the signaling concentrator node further comprising: a tracking area module configured to maintain a listing of each of the plurality of eNodeBs and a tracking area corresponding to each of the plurality of eNodeBs; a paging module configured to identify a last known location of a mobile device, and to send a paging message to the last known location of the mobile device; and a core network module configured to provide a single eNodeB interface with a single tracking area to the core mobility node.

The signaling concentrator node may further comprise a signaling suppressor configured to suppress handover signaling generated by a mobile device handing over from a source eNodeB to a target eNodeB, the source and target eNodeB both managed by the signaling concentrator node. The core mobility node may be a mobility management entity for the long term evolution (LTE) protocol.

DETAILED DESCRIPTION

Figure 1:
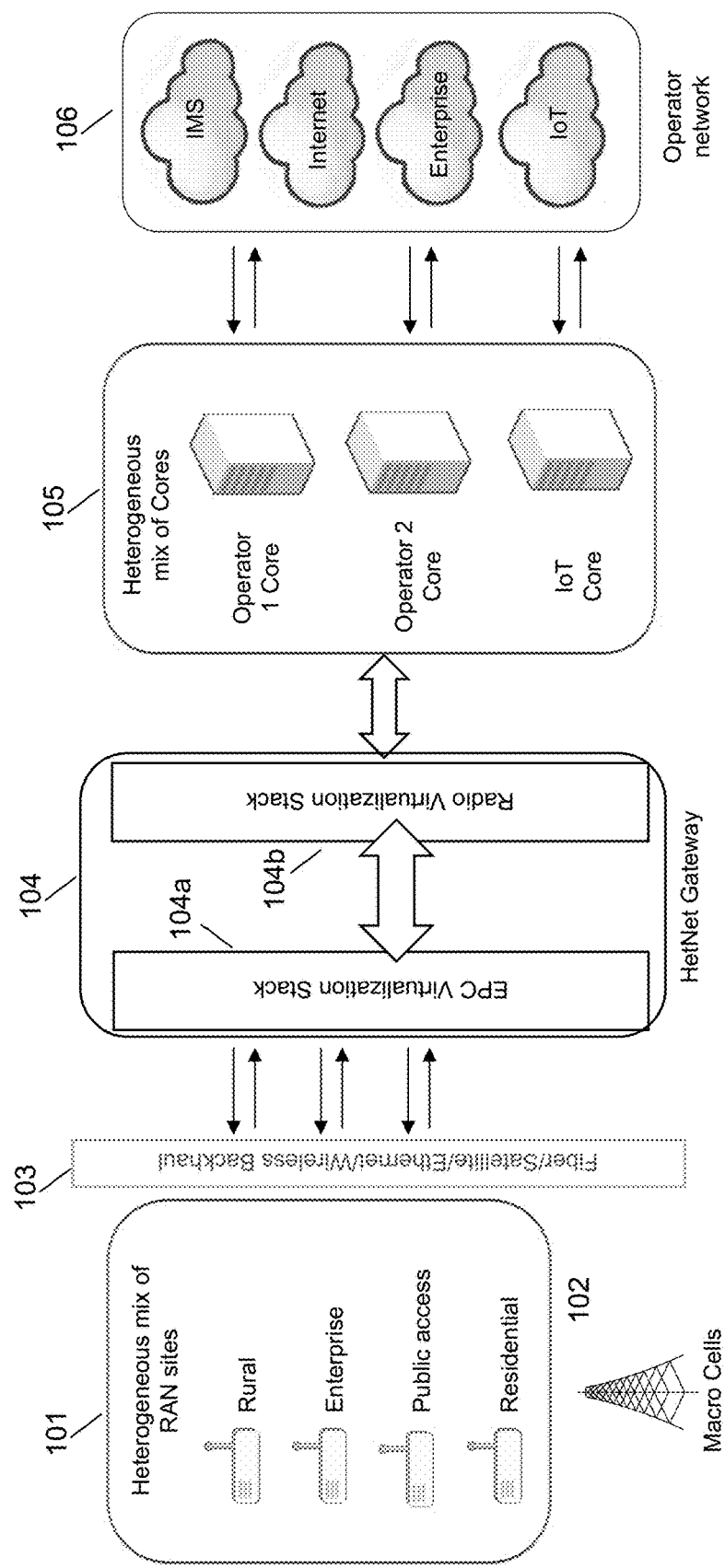
FIG. 1 is a schematic diagram of a deployment architecture for a wireless network in accordance with some embodiments.

An LTE user equipment (UE) in an active state has a location that is well-known to the core network at a cell granularity. However, when the UE is not active, it is still desirable to know the location of the UE. For this reason, when the UE is in an idle state (e.g., in one of the EMM-Registered/ECM-Idle/RRC-Idle states), its location is tracked in a tracking area (TA), which is an area identifying a group of neighbor eNodeBs. TAs are created during network radio frequency (RF) planning.

One type of signaling traffic is tracking area updates. A mobile device is capable of roaming by use of tracking areas, that is, by the use of designated logical areas between which the mobile device roams. Whenever a mobile device moves between tracking areas and connects to the network, it initiates a tracking area update (TAU) message to be sent to the core network, informing the core network that the mobile device has moved. This enables the network to find the UE when data is desired to be sent to the UE.

A UE obtains a TAI list when it attaches to an LTE network, showing the tracking areas where the LTE network believes a UE is located and within which a UE can travel without TAU. When the UE travels to a TA not in the TAI list, it is required to send a TAU to the core network, and the core network then provides the UE with a new TAI list reflecting the specific details of the UE's move (e.g. new location, moving speed, etc.) for more efficient paging.

A mobility management entity (MME) pool area is an area through which the mobile can move without a change of serving MME. Every pool area is controlled by one or more MMEs, while every base station is connected to all the MMEs in a pool area by means of the S1-MME interface. Pool areas can also overlap. Typically, a network operator might configure a pool area to cover a large region of the network such as a major city and might add MMEs to the pool as the signalling load in that city increases. Similarly, an S-GW service area is an area served by one or more serving gateways (S-GWs), through which the mobile can move without a change of serving gateway. Every base station is connected to all the serving gateways in a service area by means of the S1-U interface. S-GW service areas do not necessarily correspond to MME pool areas. MME pool areas and S-GW service areas are both made from smaller, non-overlapping units known as tracking areas (TAs). These are used to track the locations of mobiles that are on standby and are similar to the location and routing areas from UMTS and GSM.

A tracking area may include a Tracking Area Identifier (TAI) and a Tracking Area Code (TAC). A TAC is the unique code that each operator assigns to each of their TAs (e.g. TA1=0x0001 for A neighborhood, TA2=0x0002 for B neighborhood, etc.). A TAI can include a public land mobile network (PLMN) ID and a TAC. A PLMN ID is a combination of a Mobile Country Code (MCC) and a Mobile Network Code (MNC), and is the unique code assigned to each operator in the world. Korea's MCC is 450 ,and SKT's MNC is 05.So, SKT, a Korean operator, has an MCC of 450and an MNC of 05. This format of assigning makes a TAI uniquely identified globally.

Another type of traffic, mentioned above, is paging. Whenever data is sent to an idle UE, a paging request is sent to all eNodeBs in the last known tracking area of the UE. The eNodeBs then send a paging message to the UE to wake it up to receive data. Paging is resource-intensive for the network, and it is desirable to minimize paging where possible.

The tracking area is the LTE counterpart of the location area and routing area. A tracking area is a set of cells. Tracking areas can be grouped into lists of tracking areas (TA lists), which can be configured on the User Equipment (UE). Tracking area updates (TAUs) are performed periodically or when the UE moves to a tracking area that is not included in its TA list. Operators can allocate different TA lists to different UEs. This can avoid signaling peaks in some conditions: for instance, the UEs of passengers of a train may not perform tracking area updates simultaneously.

On the network side, the involved element is the Mobility Management Entity (MME). The MME configures TA lists using network access stratum (NAS) messages such as Attach Accept, TAU Accept or globally unique temporary identity (GUTI) Reallocation Command. According to the LTE standard, the MME may initiate the GUTI Reallocation procedure to reallocate the GUTI and/or TAI list at any time when a signaling association is established between UE and MME. The GUTI Reallocation procedure allocates a new GUTI and/or a new TAI list to the UE. The GUTI and/or the TAI list may also be reallocated by the Attach or the Tracking Area Update procedures.

Tracking Area list management comprises the functions to allocate and reallocate a Tracking Area Identity list to the UE. All the tracking areas in a Tracking Area List to which a UE is registered are served by the same serving MME. A tracking area identity is an identifier composed of the public land mobile network (PLMN) ID and the tracking area code (TAC). The "tracking area list concept" is used with E-UTRAN. With this concept, when the UE registers with the network, the MME allocates a set (a "list") of tracking areas to the UE. By making the centre of this set of tracking areas close to the UE's current location, the chance of a UE rapidly making another tracking area update can be reduced. A tracking area list can contain a maximum of 16 different tracking area identities, in accordance with 3GPP TS 24.301-810 § 9.9.3.33. The present application may operate within this maximum, although the maximum length of the TAL is arbitrary and the methods disclosed herein could be used with any length TAL.

A standalone tracking area update, with or without serving gateway (SGW) change, occurs when a GPRS-attached or EUTRAN-attached UE experiences any of a variety of conditions, principally, when the UE detects it has entered a new TA that is not in the list of TAIs that the UE registered with the network, or when a periodic TA update timer has expired; or a variety of other conditions. The procedure is initiated by an UE in either ECM-IDLE state or ECM-CONNECTED state. The decision to perform S-GW change during the tracking area update procedure is made by the MME independently from the triggers above.

The tracking area update is further described in TS 23.401, and cell selection for UTRAN is described in 3GPP TS 25.304 and TS 25.331.

To facilitate paging, a UE may send periodic TAU Request messages to the MME to announce that it is able to receive data, even when it is in an idle state. This allows the network to distinguish between idle UEs and UEs that have been turned off. Otherwise, the network may choose to not perform paging even when there is data traffic heading to the UE.

Tracking areas also typically require pre-planning at the RF planning stage. All LTE operators have to go through tracking area (TA)-planning exercises at the time of deployment. Many have to go through this exercise again when their network parameters change, e.g. when a large number of new users sign up in a given territory or the operator's network equipment capacities change. There are quite a few parameters which drive this exercise, including total number of simultaneously attached subscribers, busy hour paging requests per subscriber, MME paging capacity, eNodeB paging capacity, and MME signaling load to service tracking area updates. The operator has to strike a balance between these parameters to determine the appropriate TA size, number of eNodeBs per TA, and the appropriate tracking area list (TAL) handed out to UEs during signaling. If the number of eNodeBs per TAL is kept higher, it will reduce the MME signaling load via a reduction of TAUs, but it will increase the paging load on individual eNodeBs. On the other hand, if the number of eNodeBs per TAL is kept small, then it will increase the MME signaling load (more TAUs) but decrease the paging load on individual eNodeBs. It should also be noted that more number of TAUs will translate to lesser battery life for a handset.

A new solution is proposed using a coordinating server or gateway between the radio access network (RAN) and the core network. This gateway virtualizes several physical eNodeBs and presents itself as a single eNodeB to the packet core network, as explained in U.S. patent application Ser. No. 14/034,915. In some embodiments, the coordinating server may manage virtual eNodeBs using a sector ID as a means to distinguish between cells. For example, up to 255 physical eNodeBs may be managed by the coordinating server within a single virtual eNodeB, with the virtual eNodeB being reported to the core network. The sector limit for a single cell in the LTE standard is 255, and the sector identifier may be used to distinguish between each cell at the coordinating server.

One virtual eNodeB can be configured to serve multiple physical land mobile networks (PLMNs) and multiple TAs. It can be further configured what TA may be served by each physical eNodeB within this virtual eNodeB. Advantages may be obtained in paging and tracking area list management by coordination of the multiple physical eNodeBs at the coordinating gateway.

Let us see how paging works through the coordinating gateway. In some embodiments, to reach out to the UE during the idle state, MME may page the coordinating gateway. The gateway in turn has an optimized paging algorithm. It internally computes the most probable location where the UE can be reached. It may then forward the paging to physical eNodeBs which serve these locations. The coordinating gateway may have a list of physical eNodeBs and a map for determining the physical location of each of the physical eNodeBs. If UE cannot be contacted within a configured time period via this attempt, then coordinating gateway may perform additional paging, such as paging all the physical eNodeBs as per the TA list in the paging message from MME.

The coordinating gateway may keep statistics to know the success rate of the algorithm and in future it may adapt the algorithm parameters on its own to achieve a higher success rate. Alternatively, the coordinating gateway may have a list of UEs and a list of eNodeBs, and the coordinating gateway may be able to identify, from prior attach messaging, handover information, or other information, which eNodeB the UE is likely to be camped on.

A first benefit of the above scheme is that MME may have to do less paging because it has to communicate only with the coordinating gateway instead of directly communicating with every individual physical eNodeB that is part of a given TA List for the UE. Paging load is substantial in MMEs serving many thousands of simultaneously attached subscribers. Reducing it helps increase MME capacity.

A second benefit of the above scheme is that paging load on the physical eNodeBs is reduced because the coordinating gateway performs optimized paging, instead of reaching out to all the possible eNodeBs that are part of a TA List. This saves the LTE physical channel bandwidth by reducing radio signaling being used for paging. Less paging may allow more opportunity to transfer data for active subscribers translating into better user experience.

A third benefit of the above scheme is that, since the TA is no longer necessarily used for paging, the operator can choose to increase the size of the tracking areas. This involves increasing the size of the tracking areas themselves, increasing the size of the tracking area lists, or both. Recall that paging involves sending paging messages to every UE on a tracking area list. An increase in TA size may therefore lead to paging of a larger number of UEs in the ordinary case. However, normalized against the benefits offered by coordinating gateway thus running the network without affecting various capacity constraints, the tradeoff is advantageous for the operator.

The cycle of benefits starts with a reduced number of TA Updates from users. Fewer TAUs means reduced radio signaling and MME and SGW load savings. As well, fewer TAUs also provides the important benefit of saving the battery life of the user equipment (UE) because UEs need to perform signaling less frequently. As well, operators may have to put lesser effort in building the tracking area list (TAL) sets at MME because there are a lesser number of bigger TAs. Each small cell need not be part of different TA and thus it is also a possibility that the complete HNG coverage consists of just one TA. This is then the same TA advertised by HNG towards packet core as by the small cells on the radio. This is opposite the typical operator pattern of creating smaller and smaller tracking areas to minimize paging.

A small number of tracking areas listed in the TAL, each tracking area covering a larger geographic area, may thus be sufficient to permit a UE to move around without entering into coverage areas not listed in the TAL. Additionally, a reduction in the frequency of updates to the TAL to each UE, e.g., via tracking area updates or GUTI updates, may be enabled, since the need to maintain a small TAL is reduced. Additionally, updates to the TAL may become less necessary, as a mobile device may become less likely to leave the TAL.

Viewed from a TA planning perspective, the following are the challenges. TA planning is ongoing based on equipment capacity changes or large number of new subscribers. TA parameters are often complex and hard to manage. If number of eNodeBs per TA is high, a reduction in MME signaling load, but increased paging load on individual eNodeBs results. Conversely, if a small number of eNodeBs per TA is set, there is increased signaling load on MME, although there is reduction of paging load on individual eNodeBs, and there will be less battery life for UE because of an increased number of TAUs.

Thus, the tracking area concept in the LTE standard is both too granular and too broad. Tracking areas are too granular to allow for effective signaling management of large, heterogeneous, or dense networks. At the same time, they are too broad to permit a specific UE to be quickly identified for receiving data. Thus, there are great benefits to increasing tracking area size within the framework of the LTE standard, but the drawback has been until now that paging of large TAs is infeasible. The systems and methods disclosed herein allow for solving the paging problem while increasing the tracking area size.

In this disclosure, the core network/EPC sees multiple TAs managed by a coordinating gateway as one large boomer cell. No changes in TA planning are needed. The coordinating gateway coverage may be just one TA advertised by the coordinating gateway towards packet core. This is enabled using improved paging: to reach out to the UE during Idle state, the MME can page the coordinating gateway, which uses a special paging algorithm to compute the most probable location(s) where UE can be reached. The gateway may keep statistics to know the success rate of the algorithm and adapt the algorithm parameters on its own to achieve higher success rate.

Notable is that the coordinating server can in the base case handle all the increased complexity in the architecture. The eNodeBs themselves may be purchased from any vendor and need not have any particular functionality in order to participate in the enlarged tracking area methods described herein. This is because the eNodeB need only be assigned its own tracking area code (TAC) as normal, and the coordinating server handles paging for the enlarged tracking areas. This enables greater heterogeneity of base stations, which is useful in densification and overlay/underlay use cases.

Notable also is that the core network need not be modified for this configuration either. The coordinating server hides the complexity of the RAN, including the tracking area size, from the core network. The core network receives the benefits of less paging and fewer tracking area updates transparently. Also, the size of tracking areas can be increased without affecting capacity constraints.

FIG. 1 is a schematic diagram of a deployment architecture for a wireless network in accordance with some embodiments. Box 101 includes a plurality of heterogeneous radio access networks (RANs) using different radio access technologies and located in different environments. Rural, enterprise, public access, and residential radio access nodes are shown, but additional heterogeneous network access nodes may be contemplated as well, such as base stations used in a military context, small cell/micro-cell/pico-cell/femto-cell deployments, and other deployments. This heterogeneous mix of RANs is shown in conjunction with one or more macro cells 102. Each of the heterogeneous RANs and the macro cells are managed by coordinating gateway 104, as explained further below.

Backhaul for the heterogeneous RAN sites and macro cells may also be provided, as shown at box 103. The backhaul connections may also be diverse and widely varied. For example, high-throughput, low-latency fiber, high-latency satellite, Ethernet, wireless backhaul such as microwave or non-line of sight, or other backhaul connections may be used, sometimes in conjunction with each other.

Box 104 shows a coordinating node, also identified here as a heterogeneous network gateway, or hetnet gateway. Coordinating node 104 is located in the cloud and may be at a remote site, but is located between the RAN and the core network and is in communication with both RAN 101, 102 and core network(s) 105. Coordinating node 104 sends and receives all data to and from RANs 101 and 102, and may be considered a gateway between the RAN and the core network. Coordinating node 104 includes evolved packet core (EPC) virtualization stack 104a in communication with radio virtualization stack 104b. Both virtualization stacks 104a, 104b provide back-to-back user agent (B2BUA), proxy, and translation services, as described below.

EPC virtualization stack 104a serves as a core network proxy for communications between the RAN and the core network. Details regarding the core networks may be abstracted, translated, interworked, or otherwise changed, effectively virtualizing the core network to appear as a single, simplified core network to the RAN.

Radio virtualization stack 104b serves as a RAN proxy for communications to/from the core network to/from the RAN. Similar to the operation of 104a, details regarding the RAN sites may be abstracted, translated, interworked, or otherwise changed, and complexity is hidden from the core network by proxying and translating all communications from the core network. This may include masking all base station physical cell identities, tracking area codes, and other base station identifying information. From the core network's point of view, all of the RAN sites 101, 102 appear as a single base station or eNodeB. All handovers within the domain of the coordinating node are performed by the gateway, in some cases using an internal EPC functionality, and not exposed to the core network. The core network sees UE attach/detach and other service requests, but is freed from having to manage the eNodeBs themselves. According to the LTE standard, in addition to handover signaling, to prevent data loss during handover, indirect data tunnels are created by MME with source eNodeB, target eNodeB and at SGW. The coordinating node may also take care of indirect data tunneling as well, thus reducing the signaling between MME and SGW during handover.

Box 105 shows a heterogeneous mix of cores, as enabled to be used in conjunction with coordinating node 104. The heterogeneous mix of cores may include one core, two cores, or more cores. The heterogeneous mix of cores may include a dedicated core for Internet of Things (IoT) applications, or for any other applications. The heterogeneous mix of cores may include a plurality of cores managed by different administrative agencies or companies, or multiple cores managed by the same company. Although a single set of RAN nodes is not typically able to be shared among multiple cores, the use of EPC virtualization stack 104a, as described above, permits the details of the core network to be abstracted or virtualized.

Core network(s) 105 are in communication with coordinating node 104 and also with operator networks 106, for example, via a packet gateway (PGW) to the public Internet.

Box 106 shows a number of networks, public and private, that may be connected to the one or more core networks 105, including an IP Multimedia Subsystem (IMS) network for providing mobile subscriber authentication and Voice over LTE (VoLTE) functionality, the public Internet, an enterprise private network, or an Internet of Things (IoT) network.

Figure 2:
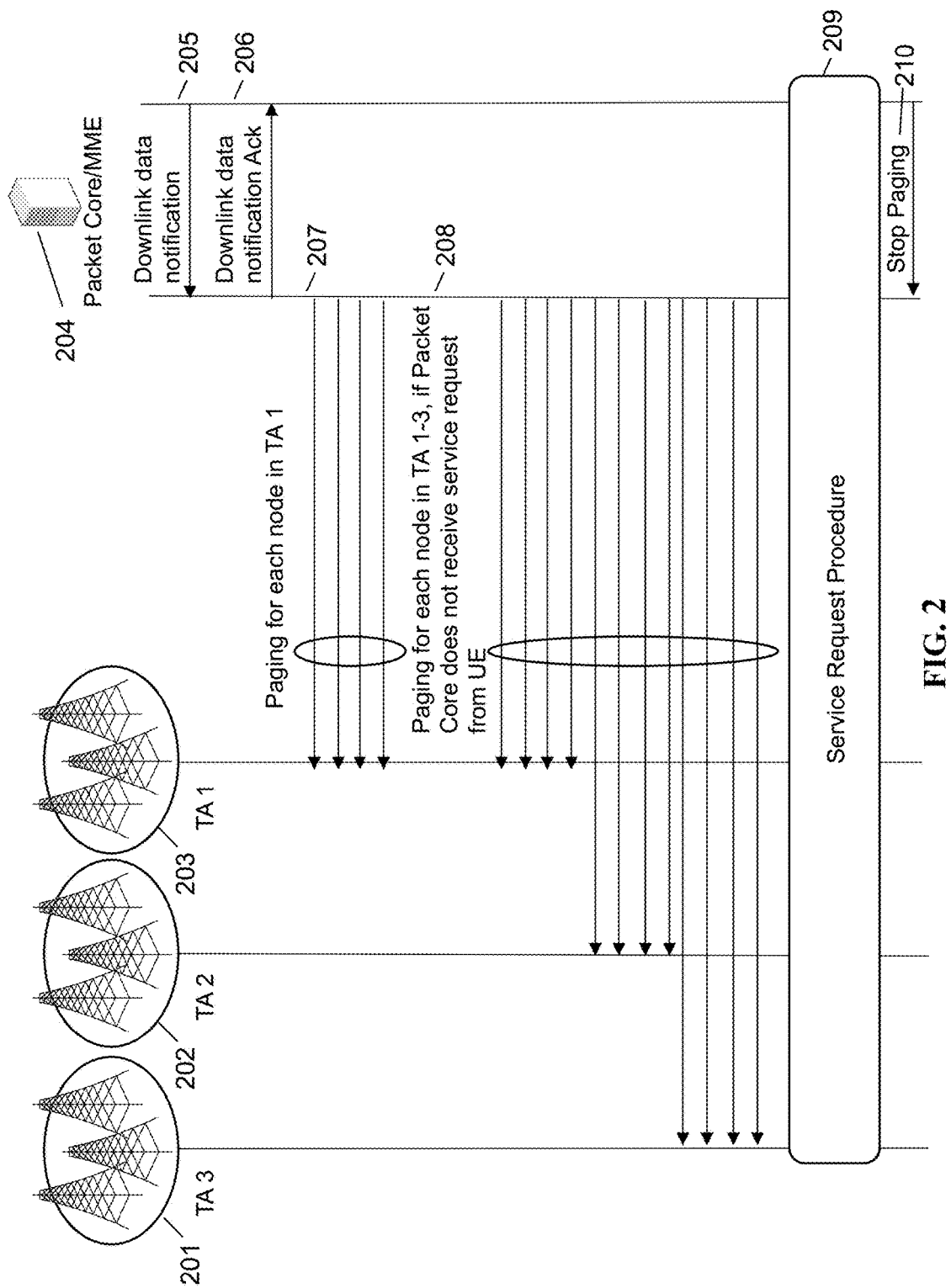
FIG. 2 is a call flow diagram of a typical paging procedure in the prior art.

FIG. 2 is a call flow diagram of a typical paging procedure in the prior art. Tracking area 1 is composed of multiple eNodeBs, as shown in the diagram at 201. As well, tracking areas 2 and 3 are composed of multiple eNodeBs at 202 and 203. At 204, a mobility management entity (MME) is shown. The MME is part of an operator core network, and is responsible for managing mobility and for performing paging of a UE when it is inactive and data is received for it at a serving gateway (SGW; not shown) in the core network. At 205, a packet core is shown. Packet core 205 represents the SGW, as well as other nodes in the core network, such as a packet gateway (PGW). Packet core 205 may be an evolved packet core (EPC).

At step 206, a downlink data notification is sent from the packet core 205 to MME 204. MME 204 acknowledges receipt of the downlink data notification at step 207. At this time, the MME must now find the UE via paging eNodeBs until the UE is found.

At step 208, the MME initiates paging. According to the LTE standard, the network keeps track of all UEs at a tracking area level, in order to facilitate paging. Therefore, the MME has information about the last known tracking area of the UE, which is TA 1 201. MME 204 thus pages the UE at TA 1. However, in the example illustrated, the UE is no longer nearby any of the base stations in TA 1.

At step 209, since the UE was not found in TA 1, MME 204 commences paging at TAs 1, 2, and 3. Multiple paging messages are sent out. The paging messages are very expensive from a network point of view, as these messages require each base station to send out a paging message and listen for responses, and as they require a great deal of signaling to be coordinated between the MME and every eNodeB in each affected tracking area. Paging messages are also expensive because, until they are stopped, they require the affected eNodeBs to repeatedly perform the paging procedure until the UE is found. Paging messages also require all UEs connected on the network to wake up to check to see whether it has been paged, draining UE battery.

At step 210, once the UE being paged receives the paging message and wakes up, the UE (not shown) responds by attaching to an eNodeB or otherwise sending a service request, and this service request is transmitted via the eNodeB up to the MME 204 and packet core 205. At step 211, the packet core connects the UE to network services, delivers the waiting data, and also causes paging to be stopped at all eNodeBs, at last ending the signaling load on the network.

Figure 3:
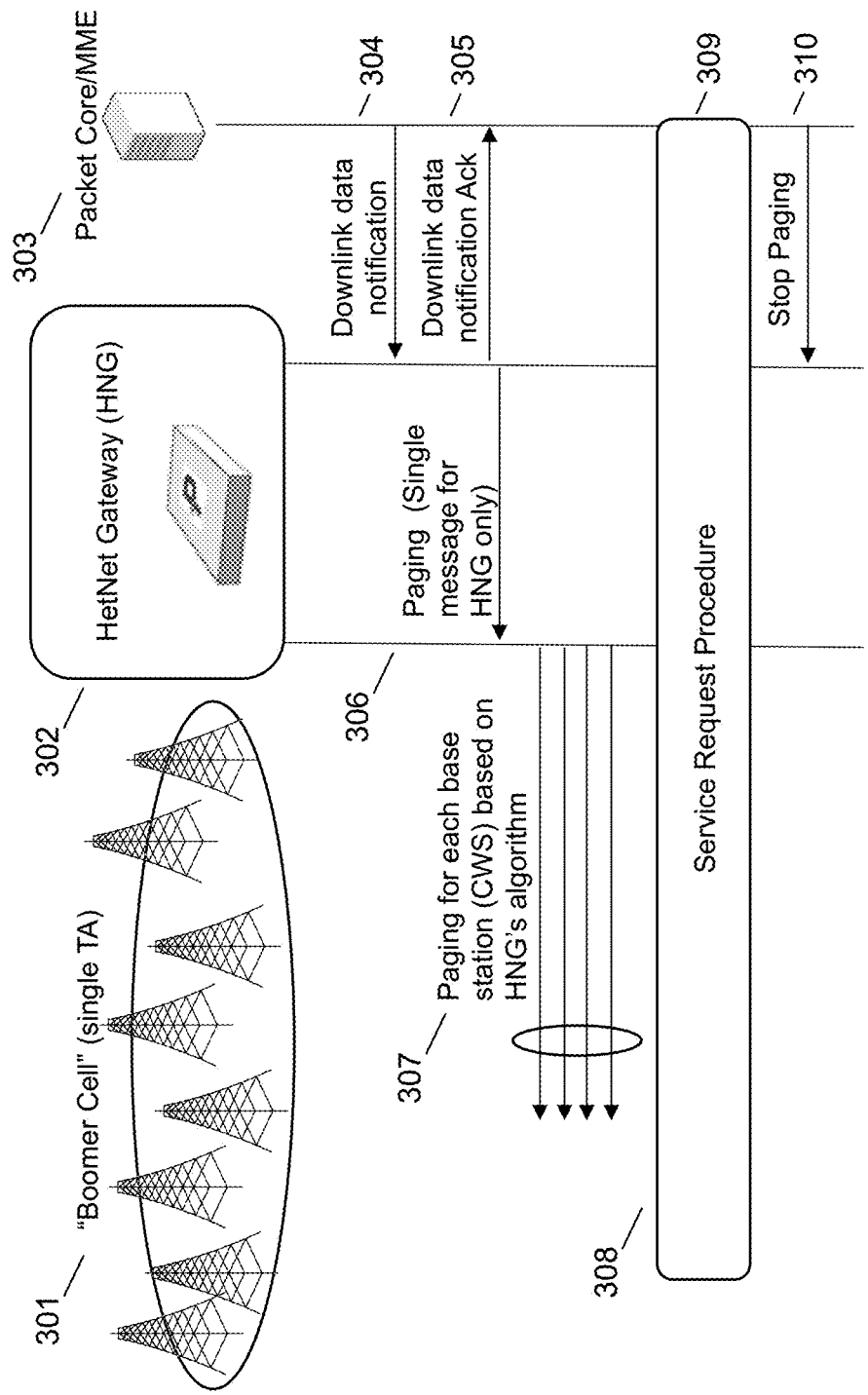
FIG. 3 is a call flow diagram of an enhanced paging procedure in accordance with some embodiments.

FIG. 3 is a call flow diagram of an enhanced paging procedure in accordance with some embodiments. Boomer cell 301 is shown at left, including a large number of base stations that are part of the same tracking area. Boomer cell 301 is managed by coordinating node 302 (identified in the figure as HetNet Gateway or HNG). Each eNodeB in boomer cell 301 is assigned the same tracking area code (TAC) by network configuration, which is sufficient to cause each eNodeB in boomer cell 301 to be identified in the same tracking area. Coupled to the other side of coordinating node 302 is MME 303, which is in communication with packet core 304. At step 305, the core network 304 transmits a downlink data notification 305 to MME 303, which then acknowledges at step 305.

At step 307, MME 303 sends a paging message to coordinating node 302. This is because MME 303 is only aware of a single eNodeB, the virtual eNodeB provided by coordinating node 302. The single paging message thus eliminates almost all of the paging traffic sent in the normal instance.

Coordinating node 302 then performs a paging method at step 308. This paging is based on a variety of information factors that do not include tracking area, as all of the base stations managed by coordinating node 302 are in the same tracking area. However, coordinating node 302 may use a variety of information, such as, for instance, last known cell location of the UE and knowledge of which eNodeBs are nearby, to effectively page the UE without causing all base stations in boomer cell 301 to perform paging.

Using this method, a dramatic reduction of paging signaling may be achieved. For example, using a tracking area size of roughly 100 base stations can result in minimal load on MME 303. This is further enhanced by the fact that handover signaling within boomer cell 301 is not transmitted to MME 303.

At step 309, the UE is found and initiates a service request procedure, which is received at step 310. The core network sends a stop paging message at step 311 to MME 303. MME 303 stops paging the coordinating node 302.

Figure 4:
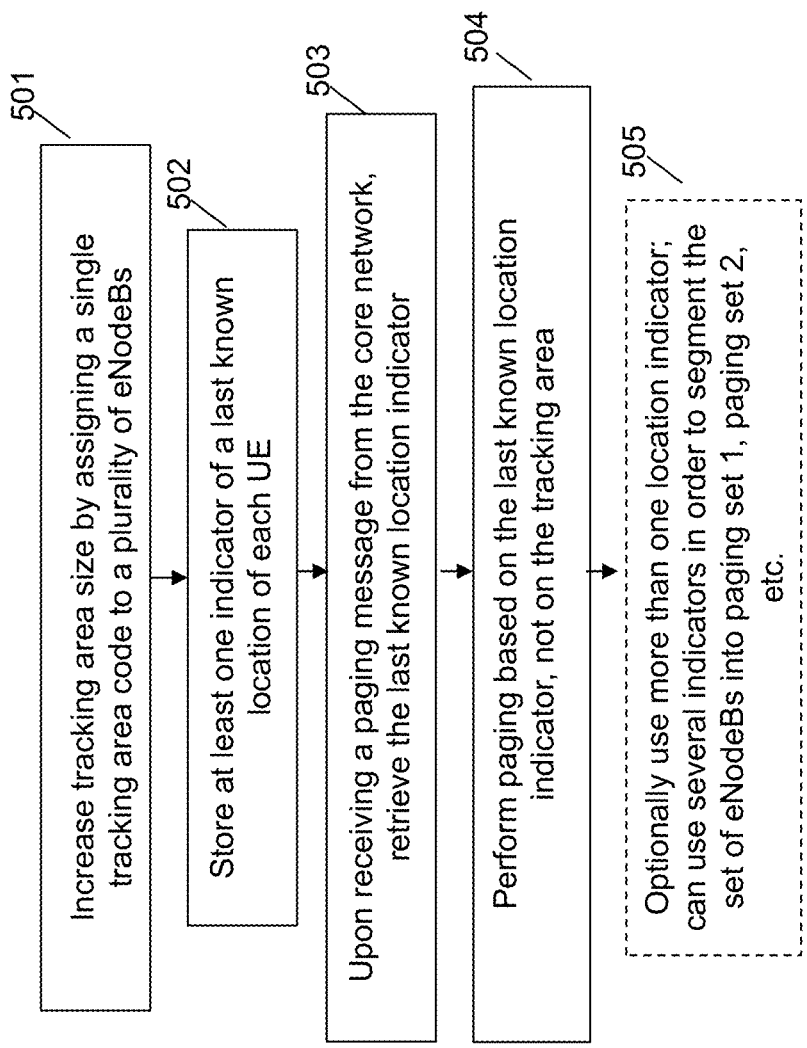
FIG. 4 is a flowchart showing tracking area planning and paging in accordance with some embodiments.

FIG. 4 is a flowchart showing tracking area planning and paging in accordance with some embodiments. At step 401, tracking area planning is performed in the operator network. This step may occur prior to deployment of one or more base stations or radio towers in the network. For example, a network operator may perform tracking area planning in conjunction with radio frequency planning (RF planning) Once tracking areas are determined by the mobile network operator, tracking area codes (TACs) corresponding to the tracking areas are distributed to each eNodeB in the network. All eNodeBs in the network that share a TAC are understood by the LTE protocol to be part of the same tracking area.

In the case described herein, where larger than normal tracking areas are created, a plurality of eNodeBs may be assigned the same tracking area. For example, where normally two or three tracking areas would be created, each having its own TAC, one TAC may be used. As another example, if a coordinating gateway is used, all eNodeBs being coordinated by that coordinating gateway may be assigned the same TAC. As another example, multiple base stations in adjacent areas, such as areas corresponding to a dense deployment of eNodeBs within a city, may be assigned the same TAC.

Assignment of the TAC may be performed by the coordinating gateway, in some embodiments. Assignment of the TAC may be changed on the fly or dynamically in a live system without causing the eNodeBs to be brought offline, by use of the coordinating gateway to handle handovers and to suppress signaling for the handovers to the core network, in some embodiments.

In some embodiments, the coordinating gateway may handle one tracking area for all its connected eNodeBs. In other embodiments, the coordinating gateway may handle more than one tracking area.

At step 402, at least one indicator of a last known location of a user equipment (UE) is stored. This indicator is stored to enable paging of the UE when a data downlink notification is received from the core network. When the same TAC is used for a large number of eNodeBs, the tracking area becomes less useful for identifying a region in which the UE is located. For this reason, different indicators may be collected and paging may be performed on the basis of these other indicators.

Other indicators may include, for example, a last-known GPS or AGPS location of a UE; a last-known position and velocity vector of the UE; a measurement report with a neighbor list for the UE; a measurement report with one or more physical cell identities (PCIs) received from the UE; a PCI or ECGI of a specific eNodeB that is the last known attach location of the UE; a historical listing of locations that the UE has been or base stations it has camped on, potentially based on network-wide information; information regarding Wi-Fi base stations or other radio access technology base stations where the UE is presently active or has been historically active; information regarding currently-pending or predicted handovers from a source base station to a target base station; or other indicators.

In some embodiments, these indicators may be solicited from the UE using various LTE protocol methods. In some embodiments, these indicators may be continuously monitored by the base station and/or a coordinating node. In some embodiments, these indicators may be used together, or in conjunction with other information, such as physical proximity information, network configuration information, or geographic or political boundary information. For example, a last-known eNodeB could be combined with the geographic coordinates of all other eNodeBs in the network to identify all base stations within a certain geographic radius. As another example, a dense hetnet may be deployed using macro cells as underlay coverage and high-frequency small cells for overlay capacity coverage. To find the UE, paging could be performed based on the last known location of the UE in conjunction with identification of only the macro cells.

At step 403, upon receiving a paging message from the core network, one or more of these last-known location indicators may be retrieved from the network and used to determine where the UE is located. At step 404, a paging algorithm is used to transform the last-known location indicator into a set of base stations to page. For example, if a last-known GPS location of a UE is known, all eNodeBs within a radius of that last-known GPS location may be added to the set of base stations to page. These indicators may be combined. For example, a last-known attached eNodeB may be identified together with its neighbors, and paged. At step 404, the base stations in this set are paged to locate and send data to the UE.

At step 405, two or more sets of eNodeBs may optionally be used. For example, GPS location and radius may be used first, followed by predicted handover targets based on this particular UE's historical behavior, followed by predicted handover targets based on all UEs observed to be camped on the last known eNodeB. As another example, GPS location and radius appropriate for a walking speed UE may be used first, followed by GPS location and radius appropriate for a UE in a car, followed by GPS location and radius appropriate for a UE in a train.

Figure 5:
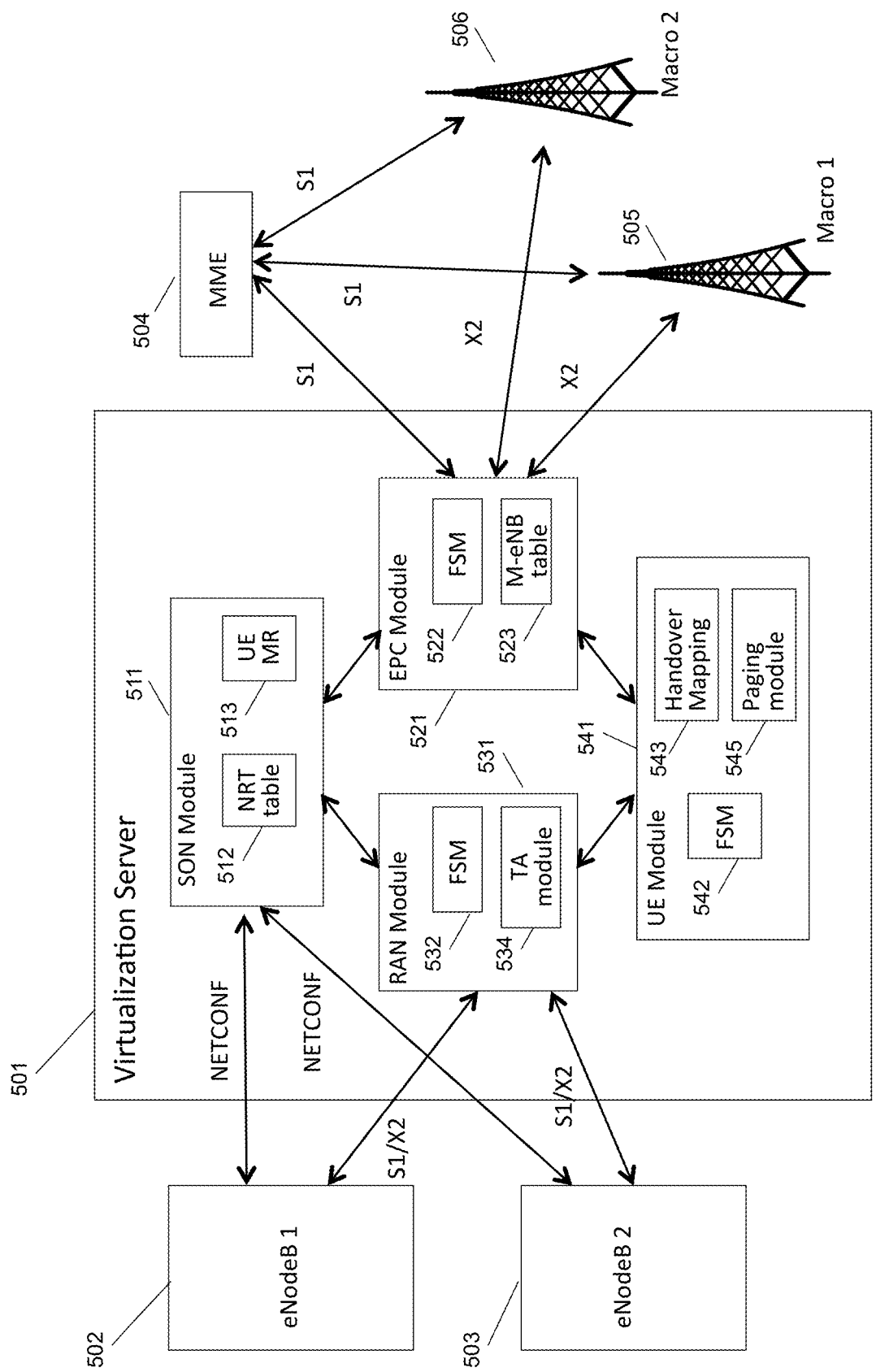
FIG. 5 is a schematic diagram of a virtualization server in a Long Term Evolution (LTE) architecture, in accordance with some embodiments.

FIG. 5 is a schematic diagram of a virtualization server in a Long Term Evolution (LTE) architecture, in accordance with some embodiments. Virtualization server 501 provides services to, and is coupled to, eNodeB 1 502 and eNodeB 5 503, on a RAN side of a network (i.e., inside of the gateway). Virtualization server 501 provides services to, and is coupled to, MME 504, macro eNodeB 505, and macro eNodeB 506, on a core network side of the network (outside of the gateway). Virtualization server 501 may provide services to a heterogeneous variety of access nodes, and may correspond to heterogeneous network gateway 104, in some embodiments.

Within virtualization server 501 are self-organizing network (SON) module 511, containing neighbor relation table (NRT) 512 and UE measurement report processing module 513; evolved packet core (EPC) module 521, containing EPC finite state machine module 522 and macro eNodeB table 523; radio access network (RAN) module 531, containing eNodeB finite state machine module 532 and tracking area module 534; and user equipment (UE) module 541, containing UE finite state machine module 542, S1/X2 handover mapping table 543, and paging module 544. Each of modules 511, 521, 531, and 541 are coupled to each other within virtualization server 501, and may execute on one or more shared processors (not shown) coupled with memory (not shown).

In some embodiments, SON module 511 may perform NRT maintenance, load information processing and fractional frequency reuse (FFR) processing; RAN module 531 may perform X2 association management with eNodeBs 502, 503; EPC module 521 may perform X2 association management with macro eNodeBs 505, 506; and UE module may perform X2 handover and S1/X2 translation between eNodeBs 502, 503 and macro eNodeBs 505, 506. All the above managers/modules interact with each other to accomplish the assigned functionality.

In any given call flow or message exchange, each module 522, 532, 542 may independently track the state of the core network/macro eNodeB, the internal eNodeB, and the UE, in some embodiments, such that the state of each of the components is fully known by one of the modules.

In some embodiments, EPC module 521 may contain EPC finite state machine module 522 and macro eNodeB table 523. EPC finite state machine module 522 may track the state of any messages or call flows being sent or received with a macro eNodeB, such as macro eNodeBs 505, 506. EPC FSM module 522 may, for example, determine whether a handover has been initiated by macro eNodeB 505, 506, as well as other functions. EPC FSM module 522 may also track which eNodeBs within the network are involved in communicating with the macro eNodeBs, and may perform network address translation by mapping incoming requests and messages from an eNodeB address external to the gateway 501 to an address internal to the gateway 501, using eNodeB table 523. In some embodiments the tracking and network address translation functions may be performed at the RAN module or in another module. Macro eNodeB table 523 may track all macro eNodeBs and any connections, bearers, tunnels, or calls open between an eNodeB internal to the gateway, such as eNodeBs 502 and 503.

In some embodiments, RAN module 531 may contain RAN finite state machine module 532 and eNodeB table 534. RAN module 531 is the counterpart to EPC module 521 on the side of the network inside the gateway. RAN FSM module 532 may track and receive messages and requests, and may track the state of the RAN node in any message exchange. An eNodeB table may include a mapping to from an eNodeB ID or cell ID to the ECGI ID used outside of the private network. In some embodiments, RAN module 531 may perform network address translation, if applicable, on messages received by RAN module from eNodeBs 502, 503, so that the messages can be sent upstream to the EPC and/or core network. In some embodiments, network address translation is used at both RAN module 531 and EPC module 521, for connections initiated at the RAN and at the EPC, respectively.

The tracking area module 534 maintains a list of all eNodeBs that are in each particular tracking area. For some virtualization servers, a single tracking area may include all eNodeBs coupled to server 501. For others, multiple tracking areas may be tracked, with some subset of the eNodeBs served by virtualization server 501 being part of each of the multiple tracking areas. When a paging request is sent for a UE, in some cases the list of base stations that are part of the single tracking area may be considered as part of the information used for identifying a set of base stations to perform paging.

As RAN module 531 is in the data path for all S1 communications to the core network, including communications to MME 504, RAN module 531 may perform proxying and network address translation for the S1 connection, in addition to supporting the X2 connection, in some embodiments. RAN module 531 may also pass along any UE measurement reports received from UEs to either or both of UE module 541 and SON module 511.

In some embodiments, UE module 541 may contain UE finite state machine module 542 and handover mapping table 543. UE finite state machine module 542 may track states for call flows that are in process between a UE connected to one or more eNodeBs and either a core network node or a target eNodeB. For example, UE FSFM 542 may track when an X2 handover request message has not been responded to and should expire. UE FSFM 542 may also track X2/S1handovers, in conjunction with handover mapping table 543. When an X2 handover request is received, UE FSFM 542 may, in some embodiments, determine whether a handover should be translated from S1 to X2, or vice versa, before the handover should continue. UE module 541 handles UE-related requests from both the RAN module 531 (from nodes internal to gateway 501) and from EPC module 521 (from nodes external to gateway 501).

Paging module 544 records information about each UE that comes in contact with virtualization server 501, through eNodeBs 502, 503, or other eNodeBs or base stations. Information such as physical location, historical location, handovers and handover preferences, as described elsewhere herein, is collected in the paging module. When a downlink data notification is received at the virtualization server, the EPC module 521 requests that the paging module 544 assist in locating the UE. Paging module 544, in some embodiments, may come up with a precise eNodeB, or may come up with a set of eNodeBs or multiple sets of eNodeBs to be paged to locate the UE, based on the stored location information. This list of eNodeBs is then sent to the RAN module 531 to initiate paging requests thereto.

Figure 6:
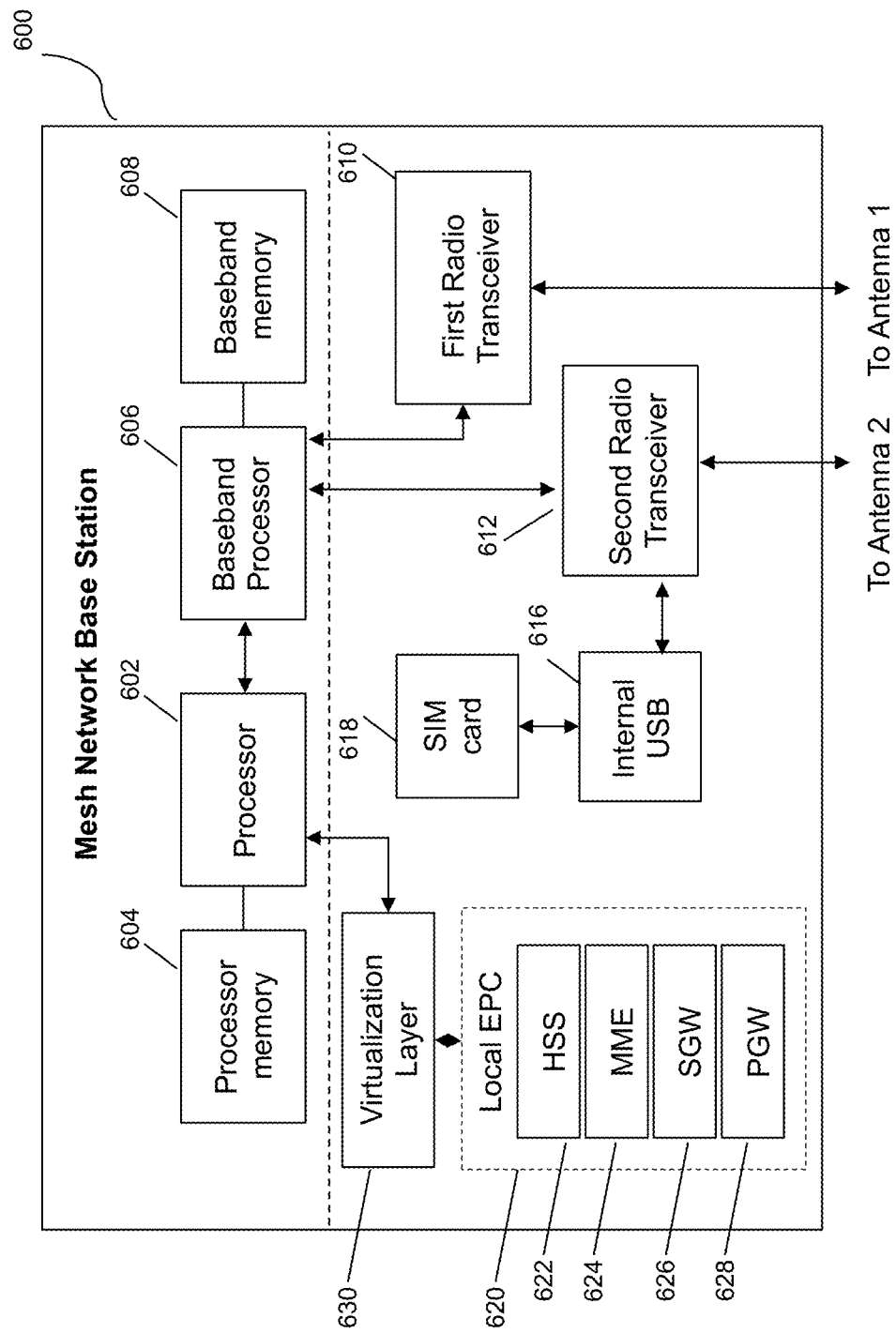
FIG. 6 is a schematic diagram of a mesh network base station, in accordance with some embodiments.

FIG. 6 is a schematic diagram of a mesh network base station, in accordance with some embodiments. Mesh network base station 600 may include processor 602, processor memory 604 in communication with the processor, baseband processor 606, and baseband processor memory 608 in communication with the baseband processor. Base station 600 may also include first radio transceiver 610 and second radio transceiver 612, internal universal serial bus (USB) port 616, and subscriber information module card (SIM card) 618 coupled to USB port 614. In some embodiments, the second radio transceiver 612 itself may be coupled to USB port 616, and communications from the baseband processor may be passed through USB port 616.

A tracking area state module 630 may maintain the tracking area code for base station 600, as well as the PLMN for the base station's network, enabling the base station to report its tracking area code and tracking area identity. Tracking area state module may also pass through requests from a core network module to send a new tracking area list to a UE. Tracking area state module may be in communication with a core network, as shown. Additionally, local EPC 620 may be used for authenticating users and performing other core network-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Virtualization layer 630 and local EPC 620 may each run on processor 602 or on another processor, or may be located within another device.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing LTE UE functionality. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughter card. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an operator EPC is available, local EPC 620 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

In some embodiments, the same architecture, design, principles, methods, and systems may be applied to, for example, MME pool areas, serving gateway (SGW) service areas, routing areas, location areas, and other areas used by a network to track and partition the location of a mobile device on the network.

In some embodiments, TACs may be assigned dynamically by the network, allowing the number of eNodeBs in a tracking area to grow and shrink as needed.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may be used to perform the steps of FIG. 2 and may execute on the general purpose processor 302.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 310 and 312. Baseband processor 306 may use memory 308 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n//ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A method, comprising:
   assigning a single tracking area code to a plurality of base stations at a messaging concentrator gateway, the messaging concentrator gateway situated in a network between the plurality of base stations and a core network;
   storing, at the messaging concentrator gateway, at least one indicator of a last known location of a user equipment (UE) other than the single tracking area code;
   receiving a paging message from the core network at the messaging concentrator gateway for a UE; and
   performing a paging sequence using the at least one indicator to identify a set of base stations to be caused to page the UE,
   wherein a base station of the plurality of base stations is a heterogeneous multi-radio access technology (multi-RAT) base station, the heterogeneous multi-RAT base station supporting at least two access technologies, and
   wherein the messaging concentrator gateway is virtualizing the plurality of base stations as a single base station towards the core network and at least one base station of the plurality of base stations is not a Home eNodeB (HeNB),
   thereby allowing a tracking area list to be used at the core network identifying the virtualized plurality of base stations as a single base station without increasing signaling traffic between the radio access network and the core network.

2. The method of claim 1, further comprising updating the single tracking area code at the plurality of base stations.

3. The method of claim 1, further comprising segmenting the plurality of base stations into subgroups, and performing paging on each of the subgroups in a specified order, the subgroups being determined based on predicted handover targets based on the UE's historical behavior, and the predicted handover targets based on a plurality of UEs observed to be camped on a last known base station of the UE.

4. The method of claim 1, further comprising assigning the single tracking area code to all base stations coupled to the messaging concentrator gateway.

5. The method of claim 1, further comprising assigning a second tracking area code to a second plurality of base stations at the messaging concentrator gateway.

6. The method of claim 1, further comprising paging the UE at both a last known base station of the UE and at the last known base station's neighbor base stations.

7. The method of claim 1, wherein the at least one indicator of the last known location of the UE is a measurement report with one or more physical cell identities (PCIs) received from the UE.

8. The method of claim 1, wherein the set of base stations caused to page the UE is within a geographic radius of the last known location of the UE, the geographic radius determined by a last known velocity vector of the UE or by an operator of the network.

9. The method of claim 1, wherein the at least one indicator of the last known location of the UE is an indication that the UE downloaded content from a local server via a Wi-Fi access network of the heterogeneous multi-RAT base station.

10. The method of claim 1, wherein the heterogeneous multi-RAT base station comprises:
    a baseband processor;
    a first radio access technology (RAT) interface; and
    a second RAT interface, wherein the first RAT interface and the second RAT interface are each capable to provide an access network to the UE and to communicate with the core network.

11. The method of claim 10, wherein the heterogeneous multi-RAT base station further comprises a global positioning system (GPS) radio interface.

12. The method of claim 10, wherein the first RAT interface is a Wi-Fi interface and the second RAT interface is a Long Term Evolution (LTE) interface for providing LTE base station functionality to the UE.

13. The method of claim 10, wherein the first RAT interface is a Universal Mobile Telecommunications System (UMTS) interface and the second RAT interface is a Long Term Evolution (LTE) interface for providing LTE base station functionality to the UE.

14. The method of claim 10, wherein the heterogeneous multi-RAT base station further comprises a processor configured to perform routing of network packets between the first and the second RAT interfaces.

* * * * *